United States Patent

Iwade et al.

[11] Patent Number: 5,970,949
[45] Date of Patent: Oct. 26, 1999

[54] INTERNAL COMBUSTION ENGINE WITH A FUEL INJECTOR FOR INJECTING FUEL DIRECTLY INTO THE CYLINDER

[75] Inventors: Kiyoshi Iwade; Kimitaka Saito; Nobuo Imatake, all of Nishio; Masanori Sugiyama, Aichi-gun; Kenji Isaka, Toyota, all of Japan

[73] Assignees: Nippon Soken, Inc., Nishi; Toyota Jidosha Kabushiki Kaisha, Aichi-ken, both of Japan

[21] Appl. No.: 09/105,020

[22] Filed: Jun. 26, 1998

[30] Foreign Application Priority Data

Jun. 27, 1997 [JP] Japan .................................. 9-172099

[51] Int. Cl.⁶ .............................. F02B 17/00; F01P 5/12
[52] U.S. Cl. ........................................ 123/295; 123/41.02
[58] Field of Search .................................... 123/295, 305, 123/41.13, 41.02

[56] References Cited

U.S. PATENT DOCUMENTS

| | | | |
|---|---|---|---|
| 4,423,705 | 1/1984 | Morita et al. | 123/41.02 |
| 5,215,053 | 6/1993 | Ito | 123/276 |
| 5,390,632 | 2/1995 | Ikebe et al. | 123/41.02 |

*Primary Examiner*—Tony M. Argenbright
*Assistant Examiner*—Arnold Castro
*Attorney, Agent, or Firm*—Pillsbury Madison & Sutro LLP

[57] ABSTRACT

In an internal combustion engine with a fuel injector for injecting fuel directly into the cylinder, in which a current combustion is changed between pre-mixture combustion and stratified charge combustion in accordance with a current engine operating condition and the flow of cooling water in a cooling system of the engine is varied according to the current combustion.

7 Claims, 6 Drawing Sheets

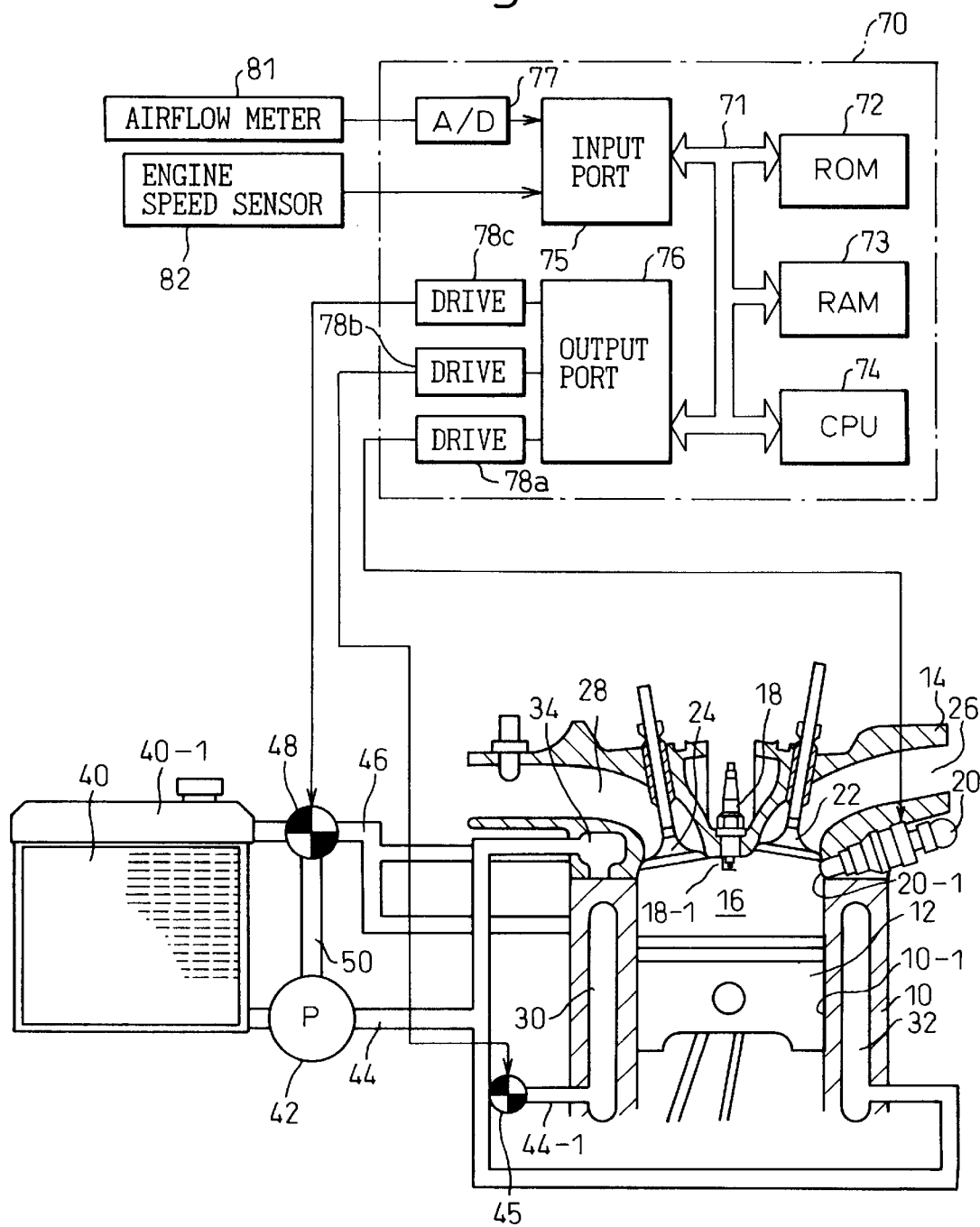

INTERNAL COMBUSTION ENGINE WITH A FUEL INJECTOR FOR INJECTING FUEL DIRECTLY INTO THE CYLINDER

BACKGROUND OF THE INVENTION

1. Field of the Invention

The present invention relates to a cooling device for an internal combustion engine with a fuel injector for injecting fuel directly into the cylinder, in which a current combustion is changed between pre-mixture combustion and stratified charge combustion in accordance with a current engine operating condition.

2. Description of the Related Art

In a known internal combustion engine with a fuel injector for injecting gasoline fuel directly into the cylinder, fuel injection at a low engine load is carried out during a compression stroke so that a combustible gas mixture is formed only close to the spark plug and thus a stratified charge combustion is carried out. On the other hand, fuel injection at a high engine load is carried out during an intake stroke so that injected fuel is sufficiently mixed with intake air and thereafter pre-mixture combustion is carried out. Japanese Unexamined Patent Publication No. 5-52145 discloses an internal combustion engine in which fuel injection timing is changed, as above-mentioned, and whereby, at a low engine load, lean burn can be realized so that fuel consumption can be improved. On the other hand, at a high engine load, a required high engine output can be obtained. The engine in which the stratified charge combustion and the pre-mixture combustion are alternated is usually cooled by cooling water. During the stratified charge combustion and during the pre-mixture combustion, the same cooling system is used, which has a passage in which cooling water circulates and a radiator in which heat of cooling water releases.

The cooling system is adapted to the pre-mixture combustion. Therefore, an excess cooling occurs during the stratified charge combustion. In the stratified charge combustion, a combustible gas mixture is formed only close to the ignition plug and thus combustion is carried out. Accordingly, the time from fuel injection to ignition is short. On the other hand, the temperature of the engine block is made low by the cooling so that injected fuel can not vaporize sufficiently in the short time. Therefore, a discharged amount of unburned fuel (HC) can increase. Moreover, if injected fuel can stick to the ignition plug, the fuel can not vaporize due to the low temperature of the engine block so that a misfire can occur. Furthermore, a difference in temperature between the center portion and the periphery portion of the piston becomes large so that a deformation of the piston is easily caused and thus scuffing of the piston can occur.

SUMMARY OF THE INVENTION

Therefore, an object of the present invention is to provide an internal combustion engine with a fuel injector for injecting fuel directly into the cylinder, which can prevent an excess cooling of the engine body at the stratified charge combustion and can guarantee a sufficient cooling of the engine body at the pre-mixture combustion.

According to the present invention, there is provided an internal combustion engine with a fuel injector for injecting fuel directly into the cylinder, in which a current combustion is changed between pre-mixture combustion and stratified charge combustion in accordance with a current engine operating condition, comprising varying means for varying flow condition of cooling water in a cooling system of the engine, according to said current combustion.

The present invention will be more fully understood from the description of preferred embodiments of the invention set forth below, together with the accompanying drawings.

BRIEF DESCRIPTION OF THE DRAWINGS

In the drawings:

FIG. 1 shows a general construction of an internal combustion engine with a fuel injector for injecting fuel directly into the cylinder according to an embodiment of the present invention;

DESCRIPTION OF THE PREFERRED EMBODIMENT

Figure 2A:
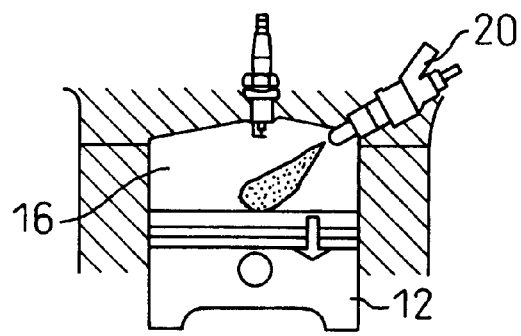
FIG. 2(A) shows a middle stage in an intake stroke at the pre-mixture combustion.

FIG. 1 shows a general construction of an internal combustion engine with a fuel injector for injecting fuel directly into the cylinder according to an embodiment of the present invention. In this figure, reference numeral 10 designates a cylinder-block in which the cylinder-bore 10-1 is formed. A piston 12 is arranged in the cylinder-bore and can slide vertically on the liner-surface thereof. A cylinder-head 14 is mounted on the cylinder-block 10. A combustion chamber 16 is formed by the cylinder-block 10 and the cylinder-head 14. An ignition plug 18 is arranged in the cylinder-head 14 and the electrodes thereof are directed into the combustion chamber 16. A fuel injector 20 is arranged in the cylinder-head 14 and the injection hole thereof 20-1 opens on the upper side of the combustion chamber 16. Intake valve 22 and exhaust valve 24 are arranged in the cylinder-head 14. The intake valve 22 opens and closes intake port 26 and the exhaust valve 24 opens and closes exhaust port 28.

In a cooling system, reference numeral 30 is a water passage for cooling the engine body, which is formed in the cylinder-block 10 at the opposite side of the fuel injector 20. Reference numeral 32 is a water passage for cooling the engine body, which is formed in the cylinder-block 10 at the side of the fuel injector 20. Reference numeral 34 is a water passage for cooling the engine body, which is formed in the cylinder-head. On the other hand, reference numeral 40 is a radiator which is connected to each entrance side of the water passages for cooling the engine body 30, 32, 34 via a water pump 42 and a water feed passage 44 on the lower side of the radiator. In a passage 44-1 by which the water feed passage 44 is connected with the water passage 30, a control valve 45 is arranged. The control valve 45 functions to vary the flow of cooling water from the water feed passage 44 to the water passage 30 in the cylinder-block 10. Each exit side (not shown) of the water passages 30, 32, 34 are connected with the entrance tank 40-1 of the radiator 40 via a water return passage 46 and a changing valve 48. A bypass passage 50 is provided between the changing valve 48 and the water pump 42. The changing valve 48 changes between a first position in which cooling water from the water return passage 46 flows into the radiator 40 and a second position in which cooling water from the water return passage 46 flows into the water pump 42 via the bypass passage 50 (i.e., cooling water bypasses the radiator 40).

Reference numeral 70 designates an electronic control unit (ECU) for controlling the fuel injector 20, the control valve 45, and the changing valve 48. The ECU 70 is constructed as a digital computer and includes a ROM (read only memory) 72, a RAM (random access memory) 73, a CPU (microprocessor, etc.) 74, an input port 75, and an output port 76, which are interconnected by a bidirectional bus 71. An air-flow meter 81 which is arranged upstream of the throttle valve in the intake passage and detects an amount of intake air, is connected to the input port 75 via an AD converter 77. An engine speed sensor 82 which is arranged on the distributor and detects the engine speed, is connected to the input port 75. The output port 76 is connected to each fuel injector 20 via a drive circuit 78a, to the control valve 45 via a drive circuit 78b, and to the changing valve 48 via a drive circuit 78c.

Figure 2B:
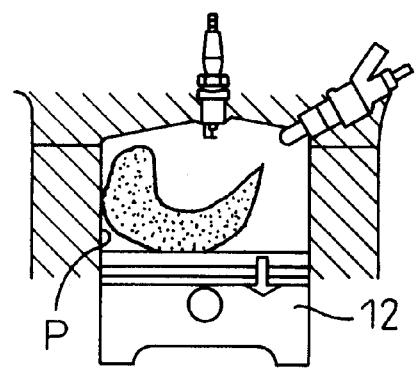
FIG. 2(B) shows a final stage in an intake stroke at the pre-mixture combustion.
Figure 2C:
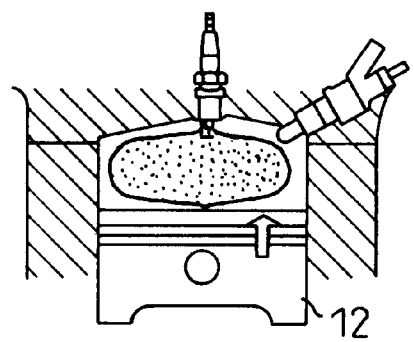
FIG. 2(C) shows an initial stage in a compression stroke at the pre-mixture combustion.
Figure 2D:
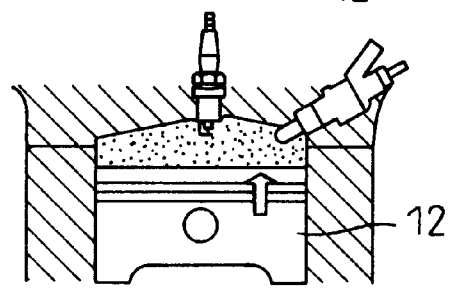
FIG. 2(D) shows a final stage in a compression stroke at the pre-mixture combustion.
Figure 2E:
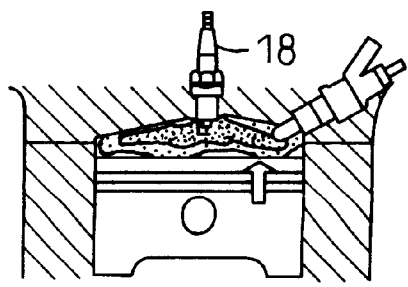
FIG. 2(E) shows an ignition stage in a compression stroke at the pre-mixture combustion.
Figure 3A:
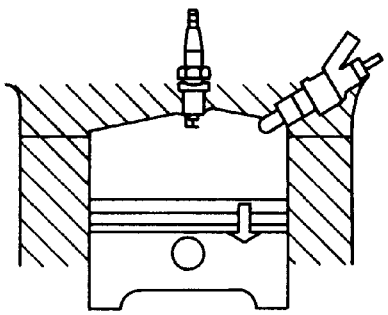
FIG. 3(A) shows a middle stage in an intake stroke at the stratified charge combustion.
Figure 3B:
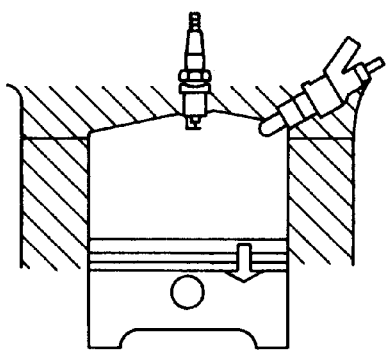
FIG. 3(B) shows a final stage in an intake stroke at the stratified charge combustion.
Figure 3C:
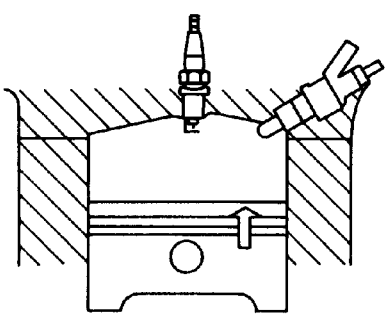
FIG. 3(C) shows an initial stage in a compression stroke at the stratified charge combustion.
Figure 3D:
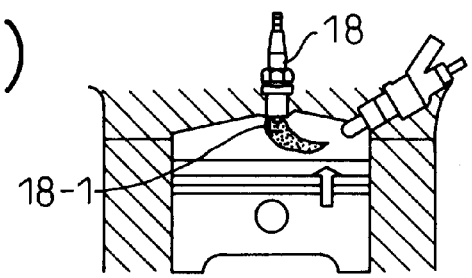
FIG. 3(D) shows a final stage in a compression stroke at the stratified charge combustion.
Figure 3E:
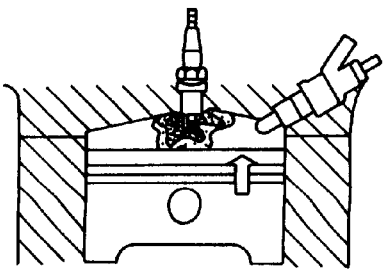
FIG. 3(E) shows an ignition stage in a compression stroke at the stratified charge combustion.

The ECU 70 controls the fuel injector 20 as follows, on the basis of a current engine load determined by an output of the air-flow meter 81. When a current engine load is high, fuel injection is carried out during an intake stroke to realize a pre-mixture combustion. On the other hand, when a current engine load is low, fuel injection is carried out during a compression stroke to realize a stratified charge combustion. FIG. 2 shows a fuel injection process for the pre-mixture combustion. FIG. 2(A) shows a middle stage in an intake stroke, in which the fuel injection starts. FIG. 2(B) shows a final stage in an intake stroke, in which the fuel injection stops. FIG. 2(C) shows an initial stage in a compression stroke, in which the injected fuel spreads in the combustion chamber. FIG. 2(D) shows a final stage in a compression stroke, in which the injected fuel is sufficiently mixed with intake air. FIG. 2(E) shows an ignition stage in which the piston 12 is close to a top dead center and the ignition plug 18 is actuated so that an ignition of the mixture is caused.

On the other hand, FIG. 3 shows a fuel injection process for the stratified charge combustion. FIG. 3(A) shows a middle stage in an intake stroke. FIG. 3(B) shows a final stage in an intake stroke. FIG. 3(C) shows an initial stage in a compression stroke. In these stages, no fuel injection is carried out. FIG. 3(D) shows a final stage in a compression stroke, in which the fuel injection starts. The injected fuel converges close to the electrodes 18-1 of the ignition plug 18 and becomes a combustible gas mixture which exists only close thereto. FIG. 3(E) shows an ignition stage in which the piston 12 is close to a top dead center and the ignition plug 18 is actuated so that an ignition of the combustible gas mixture is caused.

Figure 4:
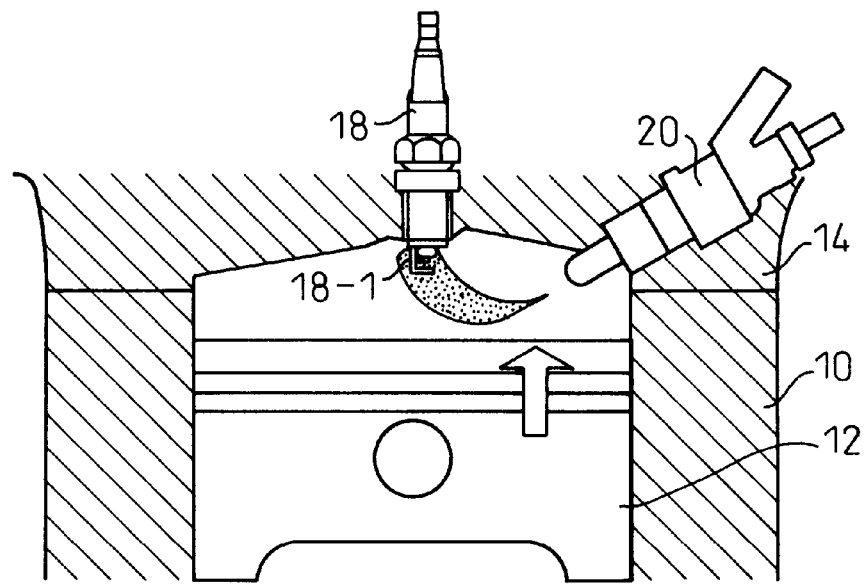
FIG. 4 is an enlarged view of FIG. 3(D)
Figure 5:
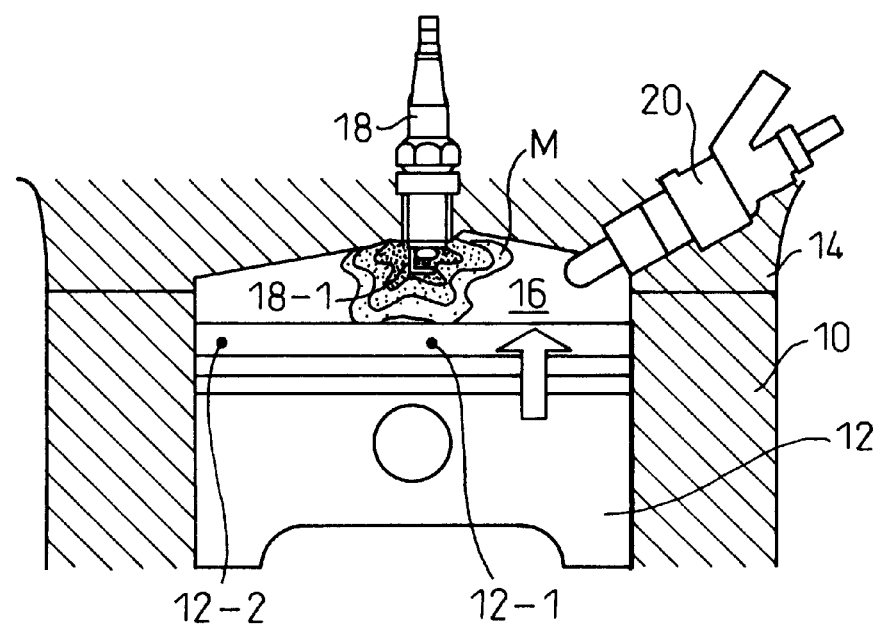
FIG. 5 is an enlarged view of FIG. 3(E)

When stratified charge combustion is carried out, if the cooling system is adapted to the pre-mixture combustion, an excess cooling occurs. This is because, in the stratified charge combustion, the amount of injected fuel is small and combustion mainly occurs only close to the electrodes 18-1 of the ignition plug so that the cylinder-block 10 and the cylinder-head 14 receives only a small amount of heat. FIG. 4 is an enlarged view of FIG. 3(D). As shown in FIG. 4, the fuel injected by the fuel injector 20 stays close to the electrodes 18-1 of the ignition plug. Therefore, the electrodes 18-1 are not sufficiently heated in the stratified charge combustion and are cooled by the fuel so that a misfire can occur. Furthermore, due to excess cooling, friction forces in sliding portions of the engine increase. FIG. 5 is an enlarged view of FIG. 3(E), and shows the combustion condition. The combustion occurs only in an area (M) close to the electrodes 18-1 of the ignition plug. Namely, the combustion is limited in the center portion of the combustion chamber 16. Therefore, the tip portion of the fuel injector 20 is out of the combustion area, and thus a temperature of the tip portion of the fuel injector 20 becomes low. Accordingly, an atomization of fuel deteriorates and thus a discharged amount of unburned fuel increases. Furthermore, a difference temperature between the center portion 12-1 and the periphery portion 12-2 of the piston 12 is made large so that a thermal deformation of the piston 12 is easily caused and thus scuffing of the piston can occur.

If the cooling system is applied to the stratified charge combustion, these problems in the stratified charge combustion can be solved. However, in this case, the cooling at the pre-mixture combustion can be insufficient so that overheating can occur.

Thus, the cooling requirement at the stratified charge combustion is different from the cooling requirement at the pre-mixture requirement. For this purpose, the ECU 70 controls the control valve 45 and the changing valve 48 according to a routine shown in FIG. 7. The routine is explained as follows. First, at step 100, it is determined if a current combustion is the stratified charge combustion. When the result is negative, i.e., the pre-mixture combustion is carried out, the routine goes to step 102 and the changing valve 48 is made the first position so that the water return passage 46 is connected to the radiator 40 and is separated from the bypass passage 50. Namely, as a water circuit shown in FIG. 8(A), the cooling water from the water pump 42 passes through the water passage 30 at the opposite side of the fuel injector, the water passage 32 at the side of the fuel injector, the water passage 34 in the cylinder-head, and the radiator 40, and returns to the water pump 42. Next, at step 104, the control valve 45 is throttled and is made partly open. Therefore, a flow rate in the water passage 30 at the opposite side of the fuel injection becomes smaller than that in the water passage 32 at the side of the fuel injector. Thus, a temperature of the liner surface of the cylinder-bore at the opposite side of the fuel injector becomes higher than that at the side of the fuel injector.

Figure 6:
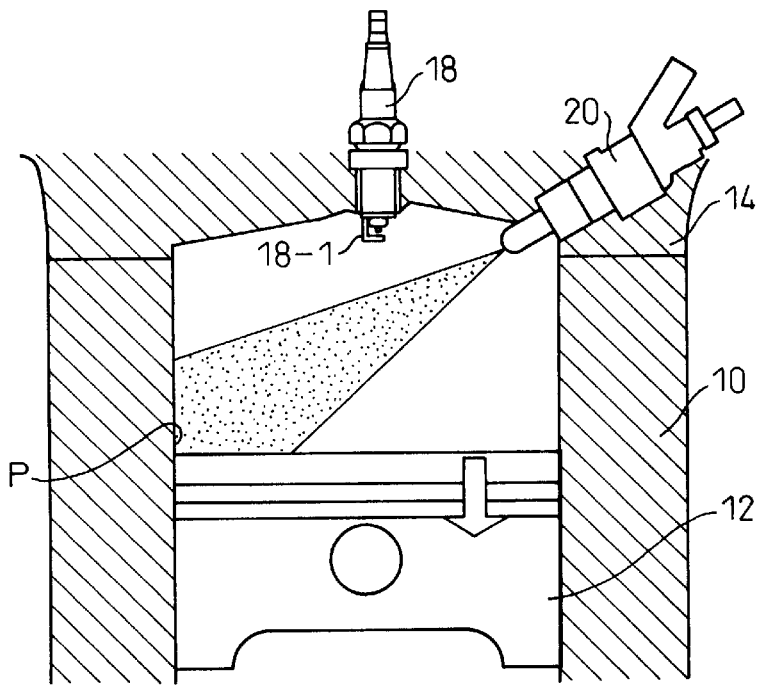
FIG. 6 is an enlarged view of FIG. 2(A), in which a piston position is slightly lower than that in FIG. 2(A)

FIG. 6 is an enlarged view of FIG. 2(A), but shows a piston position which is slightly lower than that in FIG. 2(A). As shown FIG. 6, in the pre-mixture combustion, the injected fuel sticks easily to the liner surface (P) of the cylinder-bore at the opposite side of the fuel injection 20. To prevent overheating, the whole cylinder-block 10 must be sufficiently cooled and therefore the temperature of the liner surface (P) of the cylinder-bore at the opposite side of the fuel injector becomes relative low, the stuck fuel is easily mixed with lubrication oil on the liner surface and oil dilution can occur. The oil dilution decreases the viscosity of the lubrication oil and causes an insufficient lubrication.

According to the routine, the temperature of the liner surface of the cylinder-bore at only the opposite side of the fuel injector, on which the injected fuel easily sticks, is made high so that the above-mentioned oil dilution can be prevented. On the other hand, the liner surface of the cylinder-bore at the side of the fuel injector, on which the injected fuel hardly sticks, is sufficiently cooled so that overheating can be prevented.

Figure 7:
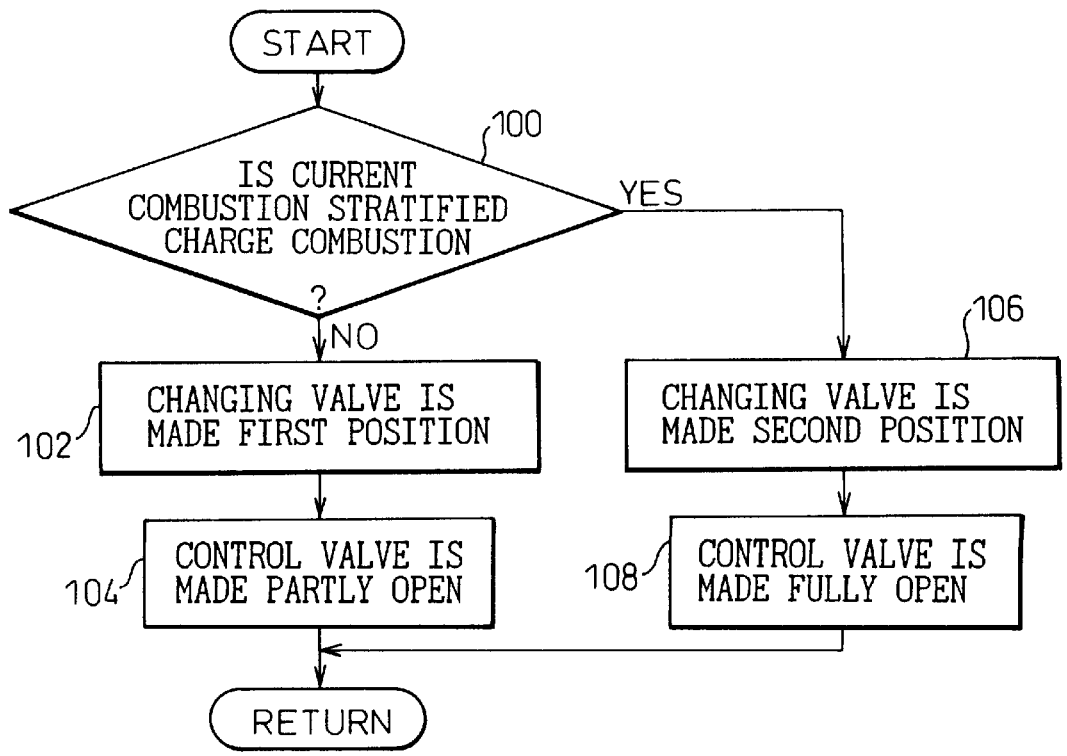
FIG. 7 is a routine for controlling the changing valve and control valve.
Figure 8A:
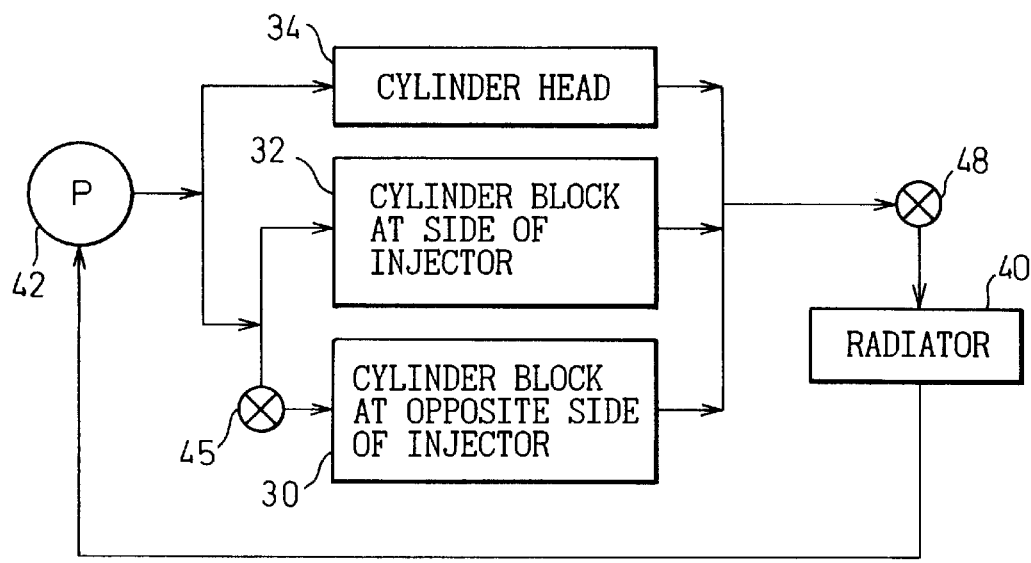
FIG. 8(A) shows a water circuit during pre-mixture combustion.
Figure 8B:
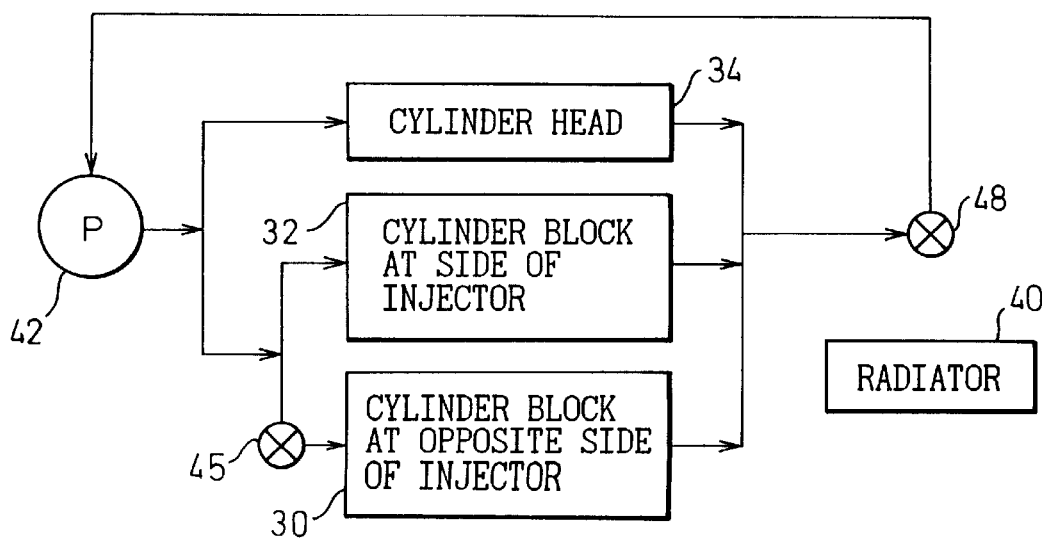
FIG. 8(B) shows a water circuit during stratified charge combustion.

Returning to the routine shown FIG. 7, when the result at step 100 is affirmative, i.e., the stratified charge combustion is carried out, the routine goes to step 106, and the changing valve 48 is made the second position so that the water return passage 46 is connected to the bypass passage 50 and is separated from the radiator 40. Namely, as a water circuit shown in FIG. 8(B), the cooling water from the water pump 42 passes through the water passage 30 at the opposite side of the fuel injector, the water passage 32 at the side of the fuel injector, the water passage 34 in the cylinder-head, and the bypass passage 50, and returns to the water pump 42. Next, at step 108, the control valve 45 is made fully open. Therefore, a flow rate in the water passage 30 at the opposite side of the fuel injection is equal to that in the water passage 32 at the side of the fuel injector. Thus, during stratified charge combustion, the cooling water does not pass through the radiator 40 so that an excess cooling can be prevented and thus the temperatures of the cylinder-block and cylinder-head are maintained high. Therefore, the temperatures of the electrodes 18-1 of the ignition plug are maintained high so that misfire can be prevented. The temperature of the tip of the fuel injector is maintained high so that an atomization of fuel can be improved. Furthermore, the temperature of the cylinder-block is maintained high so that friction forces in sliding portion of the engine decrease, and scuffing of the piston due to a thermal deformation thereof can be prevented.

Although the invention has been described with reference to specific embodiments thereof, it should be apparent that numerous modifications can be made thereto by those skilled in the art, without departing from the basic concept and scope of the invention.

We claim:

1. An internal combustion engine with a fuel injector for injecting fuel directly into the cylinder, in which a current combustion is changed between pre-mixture combustion and stratified charge combustion in accordance with a current engine operating condition, comprising varying means for varying flow condition of cooling water in a cooling system of said engine, according to said current combustion.

2. An internal combustion engine according to claim 1, wherein said cooling system has a radiator and a bypass passage bypassing said radiator.

3. An internal combustion engine according to claim 2, wherein said varying means varies the ratio of the cooling water bypassing said radiator to the cooling water passing through said radiator.

4. An internal combustion engine according to claim 3, wherein said varying means increases said ratio when said current combustion is said stratified charge combustion.

5. An internal combustion engine according to claim 2, wherein said varying means makes all of said cooling water pass through said radiator when said current combustion is said pre-mixture combustion, and makes all of said cooling water bypass said radiator when said current combustion is said stratified charge combustion.

6. An internal combustion engine according to claim 1, wherein fuel is injected during an intake stroke at said pre-mixture combustion, said cooling system has a water passage for cooling the cylinder bore at the opposite side of said fuel injector, said varying means decreases a flow rate of said cooling water passing through said water passage when said current combustion is said pre-mixture combustion.

7. An internal combustion engine according to claim 1, wherein said varying means varies said flow condition of cooling water in said cooling system, so as to decrease a temperature difference between each portions of a component in the combustion chamber of said engine, according to said current combustion.

* * * * *